United States Patent [19]

Cerroni

[11] Patent Number: 5,129,935

[45] Date of Patent: Jul. 14, 1992

[54] AERATION METHOD FOR COMPOSTING RESERVOIRS OF BIOMASS

[76] Inventor: Manlio Cerroni, Viale Poggio Fiorito, 63, I Roma, Italy

[21] Appl. No.: 387,406

[22] Filed: Jul. 31, 1989

Related U.S. Application Data

[63] Continuation of Ser. No. 862,211, filed as PCT/IT85/00028, abandoned.

[30] Foreign Application Priority Data

Aug. 7, 1984 [IT]  Italy ................ 48703 A/84

[51] Int. Cl.$^5$ ................ C12M 1/04; C05F 11/08
[52] U.S. Cl. ................ 71/9; 435/287; 435/818; 435/313
[58] Field of Search ............ 435/287, 313, 299, 300, 435/818; 71/9; 422/184

[56] References Cited

U.S. PATENT DOCUMENTS

| | | |
|---|---|---|
| 2,890,548 | 6/1959 | Wright . |
| 3,357,812 | 12/1967 | Snell . |
| 3,895,916 | 7/1975 | Rosner ................ 71/9 X |
| 4,384,878 | 5/1983 | Nordlund et al. ........ 71/8 X |
| 4,410,349 | 10/1983 | Laurenson, Jr. ........ 71/9 |
| 4,521,517 | 6/1985 | Gnuthier ................ 435/313 |
| 4,666,854 | 5/1987 | Sugiura ................ 435/313 |
| 4,837,153 | 1/1989 | Laurenson, Jr. ........ 435/243 |

FOREIGN PATENT DOCUMENTS

| | | |
|---|---|---|
| 0028194 | 5/1981 | European Pat. Off. . |
| 2415067 | 10/1975 | Fed. Rep. of Germany . |
| 0049649 | 12/1965 | Luxembourg . |
| 2060596 | 5/1981 | United Kingdom . |

*Primary Examiner*—David L. Lacey
*Assistant Examiner*—William K. Y. Chan
*Attorney, Agent, or Firm*—Watson, Cole, Grindle & Watson

[57] ABSTRACT

In a device for the aeration of composting reservoirs of biomass, each aeration mouth in the biomass being treated is supplied separately and independently from the others by means of a conduit (4) adapted to this effect. All the conduits (4) have an energy drop substantially equal to 5-20 times, preferably 8-12 times more than the energy drop of the air which traverses the biomass. Each conduit (4) is connected to the collector (5) situated outside the reservoir (1) by a closure tap (7) and is provided with a device (9) for injecting in the conduits a high pressure liquid in order to, in case of need, clear the discharge orifices when they are plugged. The conduits (4) and optionally the collector (5) are separated according to the maturity degree of the biomass, in groups having different air volume and pressure. Furthermore, the free end of each conduit (4) which terminates at the bottom (3) of the reservoir (1) acts as an aeration mouth.

1 Claim, 1 Drawing Sheet

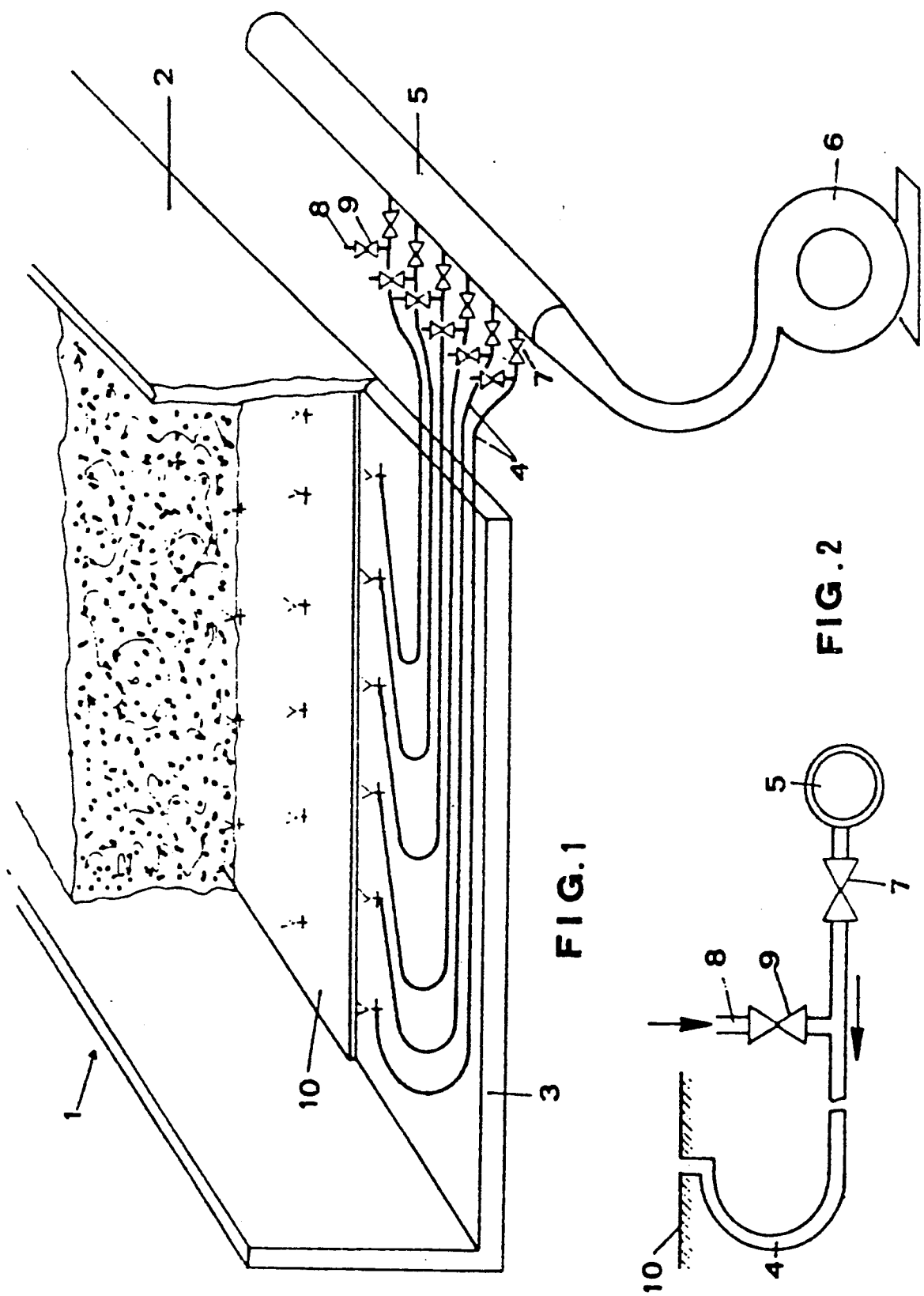

AERATION METHOD FOR COMPOSTING RESERVOIRS OF BIOMASS

This application is a continuation of application Ser. No. 862,211 filed as PCT/IT85/00028, now abandoned.

BACKGROUND OF THE INVENTION

It is known that the most efficient and at the same time the most economical method for the recycling of biomasses consists of aerobic biodegradation by microorganisms to produce fertilizers used in agriculture.

Common to all proven methods and equipment is the necessity to aerate the biomass for the purpose of promoting the growth of aerobic bacterial flora at a level which is sufficient to cause biodegradation in relatively short periods of time and without giving off undesirable odors, a side effect of the decaying process.

Aside from the amount of air which is necessary for the process and the advisability of the suction and blowing of said air, no known system is capable of guaranteeing what is fundamental, i.e., an even distribution of air throughout the mass and a constancy over time, since, at present, after short periods of time, the aeration system becomes clogged and the process of biodegradation stops and cannot be re-activated due to the presence of a considerable mass of material which, especially in automatic systems, cannot be removed.

The normally used aeration installations are placed on the bottom or the floor of the digesting installation and can be grouped into two basic systems.

The first of these systems is comprised of a collector located beside the reservoir, through which air is taken in or blown out, and which is connected to a network of conduits which pass through the reservoir. Each conduit is endowed with openings or nozzles through which the air is introduced into or suctioned from the mass. Each conduit is equipped with a valve which serves to control the air flow.

The second system is comprised of small transverse channels placed in the reservoir floor, which are covered with slit tiles to allow the passage of air while preventing the passage of material. These small transverse channels are interconnected by a small longitudinal channel which is provided to allow the periodic washing of all of the small channels with the passage of water to a collection chamber.

Both of these basic systems present notable inconveniences, the essential of which include:

a) The consistency and air permeability of the biological mass being treated vary from point to point. Indeed, in a continuous process digesting installation, which is the type utilized for medium and high production, one finds fresh material, material which is in the maturing state and material which has already matured, and each of these materials has a different degree of air permeability, and thus the air passing through a conduit will tend to exit (or enter) from the openings at which it meets the least resistance due to the different states of the material. The same can be said with respect to the small channel system with the additional drawback that it is impossible to interpose control valves.

b) The biological mass must always be very moist (with water content greater than 50%) so that the bacterial flora can develop. As such, an appreciable amount of drainage occurs towards the lower layers, which tend to become compacted on the bottom of the digesting installation, creating a layer which is impermeable or having a low degree of permeability, which cannot be removed using mechanical stirring means, which, for obvious reasons, must pass at a certain distance, however minimal, from the bottom. This bottom layer, which gradually becomes impermeable, generally forms a few months after the activation of the installation and is reinforced by the presence of colloidal substances which are formed during the process. This problem normally clogs the installation and, in the present state, requires the emptying of the reservoir and the cleaning of its floor. Such an operation, however, is inconceivable in continuous cycle industrial installations which, once filled, should never be emptied, given that the biological process which is occurring therein requires a long period of time to begin.

An object of this invention is a device which is capable of guaranteeing with certainty the passage of air through the mass which is being treated, in a uniform and continuous manner, while preventing the process of oxidation from being reduced over time.

Another object of the invention is the provision of the means to unblock, even automatically, the air outlets, which can become clogged.

SUMMARY OF THE INVENTION

In accordance with the invention, the device is comprised of an external collector in which air circulates under pressure, and out of which passes an identical number of conduits as the aeration outlets on the bottom of the digesting installation. The conduits must all have a substantially equal energy drop. In addition, this energy drop must be as much as 20 times greater than the energy drop which the air encounters while passing through the biomass to be treated.

In accordance with the invention, on each conduit stemming from the collector, and downstream therefrom, through a tapping valve, extends a section of conduit which can be connected to a source of compressed air when needed.

Another characteristic of the invention is that the outlet of each conduit of the digesting installation floor is of full section, i.e., is free of any constrictions or reductions in section due to the presence of ejectors or nozzles of any type.

The device in accordance with the invention will be better understood by reading the following description of one of the forms of embodiment thereof, which is given in reference to the attached schematic drawings:

BRIEF DESCRIPTION OF THE DRAWINGS

FIG. 1 shows the plan for the distribution of the air passage conduits;

FIG. 2 shows the plan for the feed and control of each conduit.

With reference to the drawings; and in particular to FIG. 1, on the bottom 3 of the reservoir 1 in which the mass 2 of material to be treated is placed, a series of primary conduits 4 is installed, with each conduit being connected in a manner independent from the others, to a collector or air manifold 5 through which passes pressurized air from any type of electroventilator 6.

In accordance with the invention, all of the conduits 4 have essentially the same length, the same number of bends and the same diameter. Under these conditions, all of the conduits 4 possess the same energy drop, which is one of the characteristics of the invention.

As stated, another characteristic of the invention is that the pressure of the air within the collector, and consequently that in the conduits, is such that the energy drop which is present in the conduits is notably greater than that which is encountered by the air passing through the biomass. Experiments conducted have shown that the appropriate energy drop for the conduits is between 5 and 20 times, preferably between 8 and 12 times greater than the energy drop which is present in the passage of air through the biomass.

As indicated and shown as an example in FIG. 2, each conduit 4 is connected to the collector 5 through a single closure tap or valve 7, such that it is possible to isolate each conduit individually from the collector 5. In addition, each conduit 4 downstream from the closure tap 7 is provided with a junction or secondary conduit 8, with a latch valve 9, through which, with the appropriate movement of valves 7 and 9, it is possible to connect, the conduit 4 with a source of fluid at a higher pressure than that which exists in collector 5. In other words, in the event of blockage of the outlet of one of the conduits 4, an occurrence which is possible for the aforementioned reasons, which is sufficient to cause an interruption, action on the respective tap 7, connecting said conduit 4 with the collector 5, thus causing the isolation thereof, and causing the arrival within said conduit 4, through the section 8 and the valve 9, which is now open, of an impulse of fluid which is pressurized so as to overpower the resistance of the obstruction blocking the conduit. Normal operation resumes at this time, the conduit 4 is re-connected with the collector 5, upon the closing of the valve 9. And thus, it is possible to ensure the constant efficiency of the aeration installation with a simple periodic control and to regulate the energy drop in the various conduits 4.

Another sensitive point of the installations presently in use is, as indicated, the necessity of nozzles which blow air into the digesting installation bed. This invention, as indicated, also obviates this inconvenience in that the outlet nozzle for air passing into the mass of material is comprised of the same conduit which surfaces on the bottom slab 10 of the bottom of the reservoir 1.

To meet the different requirements for air, which vary as a function of the state of maturity of the material, a division of the reservoir and the respective conduits 4 into zones is provided, possibly assigning a separate collector 5 to each zone, so as to be able to send the necessary quantity of air to each zone.

From the above emerge the obvious advantages offered by this invention. It is to be noted especially that the device is very simple and economical in its assembly and operation. It allows extremely rapid monitoring and intervention, functions which can also be robotized, and in any case, guarantees the efficiency of the aeration of the biomass and thus the uniformity and continuation of the process of biodegradation.

The device has been described and illustrated solely as a non-limitative example. This invention will obviously lend itself to variations which will emerge in technology and in practical application, without as such departing from the framework of the invention as described in the claims below.

I claim:

1. A method of aerating a biomass using an apparatus which includes a reservoir having a floor; a fluid distribution system for supplying air to said reservoir, said fluid distribution system including an air manifold, a plurality of primary conduits which extend from said air manifold to the floor of said reservoir, said primary conduits having equal diameters, essentially equal lengths, equal numbers of bends and essentially equal pressure drops along their lengths, each primary conduit including a primary valve, and secondary conduits respectively connected to said primary conduits between the primary valves therein and the reservoir, each secondary conduit including a secondary valve, the method comprising the steps of:

(a) supplying biomass to said reservoir,
   (b) supplying air to said air manifold and opening the primary valves in said primary conduits so that air from said air manifold will pass in a first direction through said primary conduits towards and into said reservoir and upwardly from the floor of said reservoir into the biomass to facilitate aeration thereof, said primary conduits eventually becoming blocked with settled biomass even through air is continuously supplied in said first direction into said reservoir,
   (c) closing the primary valves in said respective primary conduits when the primary conduits become blocked with settled biomass, and
   (d) opening the secondary valves in the secondary conduits connected to the primary conduits whose primary valves have been closed in step (c) to enable a pressure fluid to enter the respective primary conduits and flow in said first direction towards and into said reservoir to cause settled biomass to be discharged from said primary conduits back into said reservoir.

* * * * *